United States Patent
Van Steenkiste et al.

(10) Patent No.: US 7,674,076 B2
(45) Date of Patent: Mar. 9, 2010

(54) FEEDER APPARATUS FOR CONTROLLED SUPPLY OF FEEDSTOCK

(75) Inventors: Thomas Hubert Van Steenkiste, Ray, MI (US); James A. Gourash, Hermitage, PA (US); John R. Smith, Birmingham, MI (US); Keith A Kowalsky, East Norwich, NY (US)

(73) Assignee: F. W. Gartner Thermal Spraying, Ltd., Houston, TX (US)

( * ) Notice: Subject to any disclaimer, the term of this patent is extended or adjusted under 35 U.S.C. 154(b) by 556 days.

(21) Appl. No.: 11/487,298

(22) Filed: Jul. 14, 2006

(65) Prior Publication Data

US 2008/0014031 A1 Jan. 17, 2008

(51) Int. Cl.
*B65G 53/08* (2006.01)
*B65G 53/48* (2006.01)

(52) U.S. Cl. .......................... 406/52; 406/66
(58) Field of Classification Search ............ 406/52, 406/135, 62–68, 126, 124, 151, 32, 109, 406/25; 222/636, 346, 367, 368
See application file for complete search history.

(56) References Cited

U.S. PATENT DOCUMENTS

| | | | | |
|---|---|---|---|---|
| 2,314,031 | A | * 3/1943 | Colburn | 406/63 |
| 2,599,710 | A | 6/1952 | Hathaway | |
| 2,703,733 | A | * 3/1955 | Stueven | 406/39 |
| 2,712,963 | A | * 7/1955 | Edwards | 406/63 |
| 2,861,900 | A | 11/1958 | Smith et al. | |
| 2,878,972 | A | * 3/1959 | Matthews | 222/630 |
| 3,100,724 | A | 8/1963 | Rocheville | |
| 3,201,001 | A | * 8/1965 | Roberts et al. | 406/63 |
| 3,251,511 | A | * 5/1966 | Lloyd | 222/189.11 |
| 3,284,139 | A | * 11/1966 | Mylting | 406/63 |
| 3,731,354 | A | 5/1973 | Rayburn | |
| 3,876,456 | A | 4/1975 | Ford et al. | |
| 3,993,411 | A | 11/1976 | Babcock et al. | |

(Continued)

FOREIGN PATENT DOCUMENTS

DE 42 36 911 12/1993

(Continued)

OTHER PUBLICATIONS

Van Steenkiste, et al; Kinetic Spray Coatings; in Surface & Coatings Technology III; 1999, pp. 62-71.

(Continued)

*Primary Examiner*—Gene Crawford
*Assistant Examiner*—William R Harp
(74) *Attorney, Agent, or Firm*—Schubert Osterrieder & Nickelson PLLC

(57) ABSTRACT

A feeder apparatus supplies a powder feedstock to a high or low pressure processing operation. The apparatus includes a metering plate defining an annular channel having a channel width. A measuring mechanism dispenses a measured volume of the feedstock into the annular channel. The measuring mechanism includes a pay-out device defining an outlet significantly smaller than the channel width. The measuring mechanism further includes a maximum fill level defining a maximum pressure head in the feedstock less than a retaining pressure defined by the internal friction of the feedstock. The restraining pressure prevents the feedstock from spreading outwardly in the annular channel and contacting sidewalls of the annular channel under the pressure head of the feedstock. The apparatus further includes a pick-up device for removing the feedstock from the annular channel. The pick-up device includes an inlet having a rectangular shape extending across the annular channel.

18 Claims, 7 Drawing Sheets

U.S. PATENT DOCUMENTS

| | | | |
|---|---|---|---|
| 3,996,398 A | | 12/1976 | Manfredi |
| 4,005,908 A | * | 2/1977 | Freeman ..................... 406/25 |
| 4,227,835 A | * | 10/1980 | Nussbaum .................. 406/52 |
| 4,263,335 A | | 4/1981 | Wagner et al. |
| 4,263,341 A | | 4/1981 | Martyniak |
| 4,367,988 A | * | 1/1983 | Leong ......................... 406/63 |
| 4,376,600 A | * | 3/1983 | Egli ............................ 406/63 |
| 4,416,421 A | | 11/1983 | Browning |
| 4,488,837 A | * | 12/1984 | Mizokawa et al. ............ 406/34 |
| 4,528,848 A | * | 7/1985 | Hafner ......................... 73/218 |
| 4,593,727 A | * | 6/1986 | Ulveling ........................ 141/5 |
| 4,599,015 A | * | 7/1986 | Krambrock .................. 406/66 |
| 4,606,495 A | | 8/1986 | Stewart, Jr. et al. |
| 4,661,024 A | * | 4/1987 | Hafner ......................... 406/63 |
| 4,668,131 A | * | 5/1987 | Hart et al. ..................... 406/23 |
| 4,681,484 A | * | 7/1987 | Egger .......................... 406/63 |
| 4,747,524 A | * | 5/1988 | Krambrock .................. 222/636 |
| 4,789,569 A | * | 12/1988 | Douche et al. .............. 427/180 |
| 4,863,076 A | * | 9/1989 | Anderson et al. ........... 222/636 |
| 4,883,390 A | * | 11/1989 | Reintjes et al. ............... 406/24 |
| 4,891,275 A | | 1/1990 | Knoll |
| 4,939,022 A | | 7/1990 | Palanisamy |
| 5,104,230 A | * | 4/1992 | Douche et al. ........... 366/156.1 |
| 5,187,021 A | | 2/1993 | Vydra et al. |
| 5,217,746 A | | 6/1993 | Lenling et al. |
| 5,271,965 A | | 12/1993 | Browning |
| 5,273,584 A | * | 12/1993 | Keller ........................ 118/692 |
| 5,302,414 A | | 4/1994 | Alkhimov et al. |
| 5,308,463 A | | 5/1994 | Hoffmann et al. |
| 5,324,142 A | * | 6/1994 | Haig ............................ 406/66 |
| 5,340,015 A | | 8/1994 | Hira et al. |
| 5,356,599 A | * | 10/1994 | Miura et al. ................. 422/219 |
| 5,362,523 A | | 11/1994 | Gorynin et al. |
| 5,395,679 A | | 3/1995 | Myers et al. |
| 5,424,101 A | | 6/1995 | Atkins et al. |
| 5,464,146 A | | 11/1995 | Zaluzec et al. |
| 5,476,725 A | | 12/1995 | Papich et al. |
| 5,525,570 A | | 6/1996 | Chakraborty et al. |
| 5,527,627 A | | 6/1996 | Lautzenhiser et al. |
| 5,551,492 A | * | 9/1996 | Rack et al. ................... 141/147 |
| 5,585,574 A | | 12/1996 | Sugihara et al. |
| 5,593,740 A | | 1/1997 | Strumban et al. |
| 5,648,123 A | | 7/1997 | Kuhn et al. |
| 5,655,853 A | * | 8/1997 | Wormser ...................... 406/66 |
| 5,683,615 A | | 11/1997 | Munoz |
| 5,795,626 A | | 8/1998 | Gabel et al. |
| 5,854,966 A | | 12/1998 | Kampe et al. |
| 5,875,626 A | | 3/1999 | Cromartie |
| 5,887,335 A | | 3/1999 | Garshells |
| 5,889,215 A | | 3/1999 | Kilmartin et al. |
| 5,894,054 A | | 4/1999 | Paruchuri et al. |
| 5,907,761 A | | 5/1999 | Tohma et al. |
| 5,952,056 A | | 9/1999 | Jordan et al. |
| 5,965,193 A | | 10/1999 | Ning et al. |
| 5,989,310 A | | 11/1999 | Chu et al. |
| 5,997,220 A | * | 12/1999 | Wormser ...................... 406/66 |
| 6,033,622 A | | 3/2000 | Maruyama |
| 6,051,045 A | | 4/2000 | Narula et al. |
| 6,051,277 A | | 4/2000 | Claussen et al. |
| 6,074,737 A | | 6/2000 | Jordan et al. |
| 6,119,667 A | | 9/2000 | Boyer et al. |
| 6,129,948 A | | 10/2000 | Plummer et al. |
| 6,139,913 A | | 10/2000 | Van Steenkiste et al. |
| 6,149,736 A | | 11/2000 | Sukigara et al. |
| 6,159,430 A | | 12/2000 | Foster |
| 6,189,663 B1 | | 2/2001 | Smith et al. |
| 6,257,804 B1 | * | 7/2001 | Gathmann .................. 406/68 |
| 6,283,386 B1 | | 9/2001 | Van Steenkiste et al. |
| 6,283,859 B1 | | 9/2001 | Carlson et al. |
| 6,289,748 B1 | | 9/2001 | Lin et al. |
| 6,317,913 B1 | | 11/2001 | Kilmer |
| 6,338,827 B1 | | 1/2002 | Nelson et al. |
| 6,344,237 B1 | | 2/2002 | Kilmer |
| 6,402,050 B1 | | 6/2002 | Kashirin et al. |
| 6,422,039 B2 | | 7/2002 | Bamminger et al. |
| 6,422,360 B1 | | 7/2002 | Oliver et al. |
| 6,465,039 B1 | | 10/2002 | Pinkerton et al. |
| 6,485,852 B1 | | 11/2002 | Miller et al. |
| 6,511,135 B2 | | 1/2003 | Ballinger et al. |
| 6,537,507 B2 | | 3/2003 | Nelson et al. |
| 6,543,708 B1 | * | 4/2003 | Stephenson, Jr. ............ 239/691 |
| 6,592,947 B1 | | 7/2003 | McCane et al. |
| 6,623,704 B1 | | 9/2003 | Roth |
| 6,623,796 B1 | | 9/2003 | Van Steenkiste |
| 6,624,113 B2 | | 9/2003 | LaBarge et al. |
| 6,651,843 B2 | * | 11/2003 | Kowalsky et al. ............... 222/1 |
| 6,861,101 B1 | | 3/2005 | Kowalsky et al. |
| 6,915,964 B2 | | 7/2005 | Tapphorn et al. |
| 6,986,471 B1 | | 1/2006 | Kowalsky et al. |
| 7,226,248 B2 | * | 6/2007 | Hafner et al. ................ 406/146 |
| 2002/0071906 A1 | | 6/2002 | Rusch |
| 2002/0102360 A1 | | 8/2002 | Subramanian et al. |
| 2002/0112549 A1 | | 8/2002 | Cheshmehdoost et al. |
| 2003/0219576 A1 | | 11/2003 | Emoursi et al. |
| 2004/0101738 A1 | | 5/2004 | Tawfik et al. |
| 2004/0157000 A1 | | 8/2004 | VanSteenkiste |
| 2005/0040260 A1 | | 2/2005 | Zhao et al. |

FOREIGN PATENT DOCUMENTS

| | | |
|---|---|---|
| DE | 199 59 515 | 6/2001 |
| DE | 100 37 212 | 1/2002 |
| DE | 101 26 100 | 12/2002 |
| EP | 0860516 A1 | 3/1998 |
| EP | 0860516 A2 | 3/1998 |
| EP | 1 160 348 | 12/2001 |
| EP | 1245854 A2 | 12/2002 |
| JP | 55031161 | 3/1980 |
| JP | 61249541 | 11/1986 |
| JP | 04180770 | 6/1992 |
| JP | 04243524 | 8/1992 |
| WO | 98/22639 | 5/1998 |
| WO | 02/52064 | 1/2002 |
| WO | 03009934 | 2/2003 |

OTHER PUBLICATIONS

Liu, et al; Recent Development In the Fabrication of Metal Matrix-Particulate Composites Using Powder Metallurgy Techniques, in Journal of Material Science; 1994; pp. 1999-2007; National University of Singapore, Japan.

Papyrin; The Cold Gas-Dynamic Spraying Method A New Method For Coatings Deposition Promises A New Generation of Technologies, Novosibirsk, Russia.

McCune, et al; Characterization of Copper And Steele Coatings Made By The Cold Gas-Dynamic Spray Method; National Thermal Spray Conference.

Alkhimov, et al; A Method of "Cold" Gas-Dynamic Deposition; Sov. Phys. Kokl. 36 (Dec. 12, 1990); pp. 1047-1049.

Dykuizen, et al; Impact of High Velocity Cold Spray Particles; in Journal of Thermal Spray Technology 8(4); 1999 pp. 559-564.

Swartz, et al; Thermal Resistance At Interfaces; Appl. Phys. Lett., vol. 51, No. 26, 28; Dec. 1987; pp. 2201-2201.

Davis, et al; Thermal Conductivity of Metal-Matrix Composites; J. Appl. Phys. 77(10), May 15, 1995; pp. 4494-4960.

Stoner, et al; Measurements of the Kapitza Conductance between Diamond and Several Metals; Physical Review Letters, vol. 68, No. 10, Mar. 9, 1992; pp. 1563-1566.

Stoner, et al; Kapitza conductance and heat flow between solids at temperatures from 50 to 300k; Physical review B, vol. 48, No. 22, Dec. 1, 1993-II; pp. 16374; 16387.

Johnson, et al; Diamond/Al metal matrix composites formed by the pressureless metal infiltration process; J. Mater, Res., vol. 8, No. 5, May 1993; pp. 1169-1173.

Rajan, et al; Reinforcement coatings and interfaces in Aluminum Metal Matrix Composites; pp. 3491-3503.

LEC Manufacturing And Engineering Components; Lanxide Electronic Components, Inc.

Dykhuizen, et al.; Gas Dynamic Principles of Cold Spray; Journal of Thermal Spray Technology; Jun. 1998; pp. 205-212.

McCune, et al; An Exploration of the Cold Gas-Dynamic Spray Method For Several Materials Systems.

Ibrahim, et al; Particulate Reinforced Matrix Composites—A Review; Journal of Matrials science 26; pp. 1137-1156.

I.J. Garshelis, et al; A Magnetoelastic Torque Transducers Utilizing a Ring Divided Into Two Oppositely Polarized circumferential Regions; MMM 1995; Paper No. BB-08.

I.J. Garshelis, et al; Develoopment of a Non-Contact Torque Transducer For Electric Power Steering Systems; SAE Paper No. 920707; 1992; pp. 173-182.

Boley, et al; The Effects of Heat Treatment on the Magnetic Behavior of Rng—Type Magnetoelastic Torque Sensors; Proceedings of Sicon '01; Nov. 2001.

J.E. Snyder, et al; Low Coercivity Magnetostrictive Material With Giant Piezomagnetic d33, Abstract Submitted for the MAR 99 Meeting of the American Physical Society.

McCune, et al; An Exploration of the Cold Gas-Dynamic Spray Method . . . ; Proc. Nat. Thermal Spray Conf. ASM Sep. 1995.

Pavel Ripka, et al; Pulse Excitation of Micro-Fluxgate Sensors, IEEE Transactions on Magnetics, vol. 37, No. 4; Jul. 2001, pp. 1998-2000.

Trifton M. Liakopoulos, et al; Ultrlahigh Resolution DC Magnetic Field Measurements Using Microfabricated FluxgateSensor Chips, University of Cincinnati, Ohio, Center For Microelectronic Sensors and MEMS, Dept. of ECECS pp. 630-631.

Derac Son, A New Type of Fluxgate Mangetometer Using Apparent Coercive Field Strength Measurement, IEEE Transactions on Magnetics, vol. 25, No. 5, Sep. 1989, pp. 3420-3422.

O. Dezauri, et al; Printed Circuit Board Integrted Fluxgate Sensor, Elsevier Science S.A. (2000) Sensors and Actuators, pp. 200-203.

Moreland, Fluxgate Magnetometer, Carl W. Moreland, 1999-2000, pp. 1-9.

Ripka, et al; Symmetrical Core Improves Micro-Fluxgate Sensors, Sensors and Acutuators, Version 1, Aug. 25, 2000, pp. 1-9.

Hoton How, et al; Development of High-Sensitivity Fluxgate Magnetometer Using Single-Crystal Yttrium Iron Garnet Film as the Core Material, ElectroMagnetic Applications, Inc.

Ripka, et al; Microfluxgate Sensor With Closed Core, submitted for Sensors and Actuators, Version 1, Jun. 17, 2000.

Hendriksen, et al; Digital Detection and Feedback Fluxgate Magnetometer, Meas. Sci. Technol. 7 (1996) pp. 897-903.

Cetek 930580 Compass Sensor, Specifications, Jun. 1997.

Geyger, Basic Principles Characteristics and Applications, Magnetic Amplifier Circuits, 1954, pp. 219-232.

\* cited by examiner

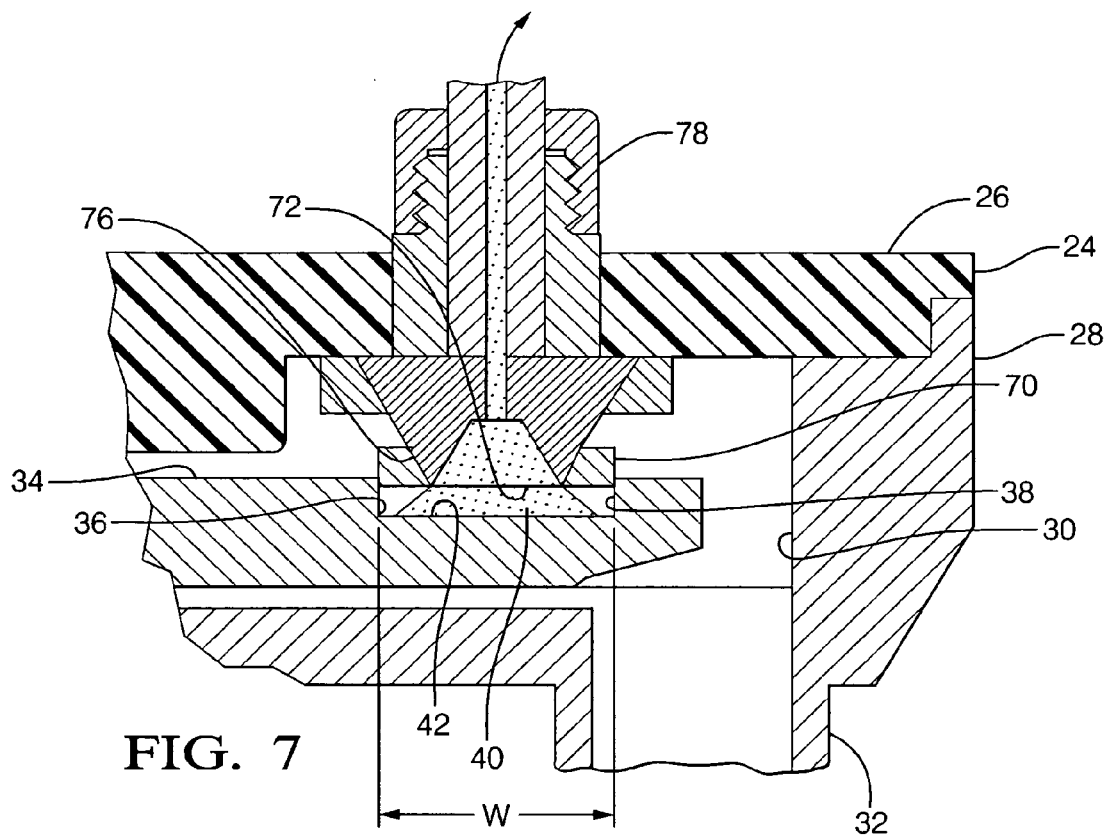
FIG. 7
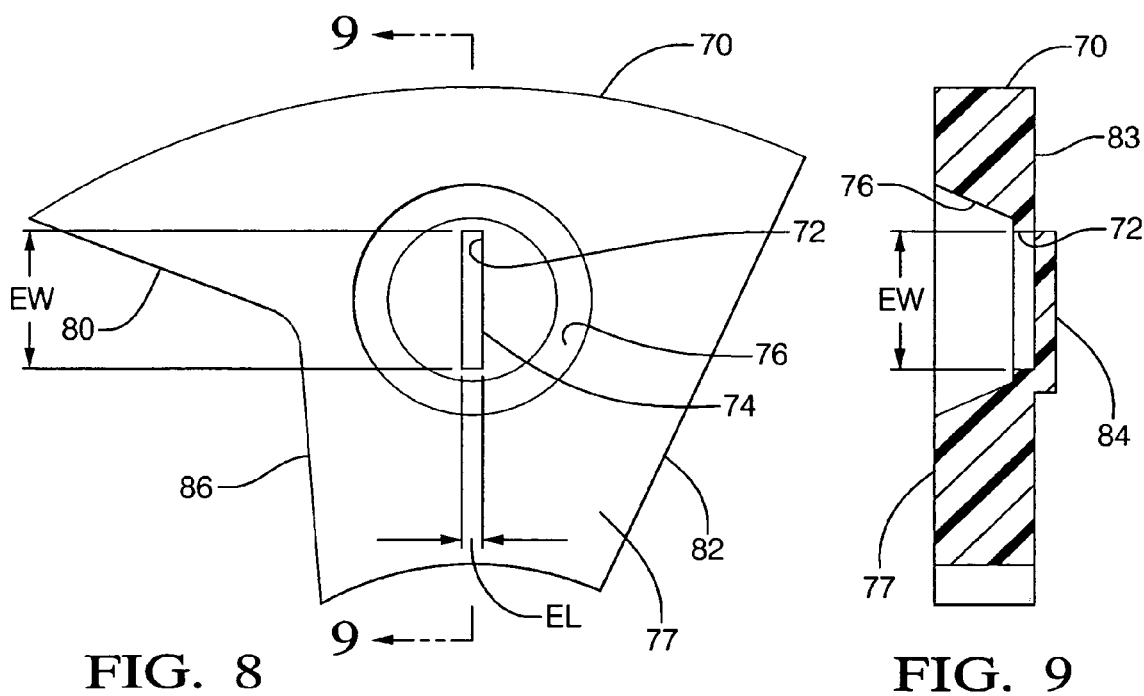
FIG. 8
FIG. 9

FEEDER APPARATUS FOR CONTROLLED SUPPLY OF FEEDSTOCK

BACKGROUND OF THE INVENTION

1. Field of the Invention

The subject invention generally relates to a feeder apparatus for supplying a measured flow of a powdered feedstock to a processing operation, such as a kinetic spray process and a method of supplying the powdered feedstock via a canister to the continuously operating feeder apparatus.

2. Description of the Prior Art

Various types of metering mechanisms for supplying a measured volume of a powdered feedstock to a processing facility are well known in the art. U.S. Pat. No. 4,227,835 to Nussbaum discloses one configuration of such a feeder apparatus. The feeder apparatus includes a casing having a top portion and a bottom portion, which define a sealed interior chamber therebetween. The casing includes a gas port for supplying a pressurized gas into the sealed interior chamber of the casing. A metering plate is disposed within the sealed interior chamber of the casing and includes an inner sidewall, an outer sidewall, and a bottom wall defining an annular channel therebetween. During operation, the annular channel rotates about a vertical axis. The annular channel is spaced radially from the vertical axis. A hopper is disposed above the metering plate for storing the feedstock therein. A payout device including an elongated opening substantially the same width as the annular channel is disposed between the hopper and the metering plate for dispensing a measured volume of the feedstock from the hopper into the annular channel of the metering plate. A pick-up device is disposed above the metering plate and defines a circular inlet for removing the feedstock from the annular channel.

The feedstock flows from the hopper through the pay-out device and into the annular channel, completely filling the annular channel below the pay-out device. It is quite common for particles of the feedstock to spill over the sidewalls of the channel, and onto the metering plate. When the powdered feedstock being used is a ductile material, such as tin or zinc, any particles trapped between the metering plate and the pay-out device or between the metering plate and the pick-up device will cold-weld together possible crating a galling effect in the metering plate damaging the metering late. Alternatively, the particles cold-welded together may block the circular inlet of the pick-up device restricting or stopping a flow of the feedstock therethrough.

SUMMARY OF THE INVENTION AND ADVANTAGES

The subject invention provides a feeder apparatus for supplying a flow of a feedstock to a processing operation. The feeder apparatus includes a casing having a top portion and a bottom portion. The casing defines a sealed interior chamber therebetween and includes a gas port for supplying a pressurized gas into the sealed interior chamber. A metering plate is disposed within the sealed interior chamber and includes an inner sidewall, an outer sidewall, and a bottom wall defining an annular channel therebetween. The annular channel rotates about and is in spaced radial relationship with a vertical axis. A hopper is disposed above the metering plate and stores the feedstock therein. A measuring mechanism is provided for dispensing a measured volume of the feedstock from the hopper into the annular channel of the metering plate. A pick-up device is disposed above the metering plate for removing the feedstock from the annular channel. The pick-up device defines an inlet having an elongated shape over the annular channel. The elongated shape has a length extending tangentially relative to the annular channel and a width extending perpendicularly relative to the length of the elongated shape with the width being greater than the length.

The measuring mechanism includes a pay-out device for distributing the feedstock into the annular channel. The annular channel defines a channel width, with the pay-out device defining an outlet having a diameter less than the channel width. The hopper includes a maximum fill level, which is disposed a pre-determined height above the annular channel. The maximum fill level defines a maximum pressure head in the feedstock, which is less than a retaining pressure defined by an internal friction of the feedstock disposed between the annular channel and the pay-out device. The retaining pressure restrains the feedstock against a force exerted by the pressure head to prevent the feedstock from spreading outwardly and contacting the inner sidewall and the outer sidewall of the annular channel.

Accordingly, the feeder apparatus is capable of utilizing non-ductile materials as well as ductile materials as the feedstock by preventing spillage of the feedstock over the inner sidewall and the outer sidewall of the annular channel onto the metering plate. Additionally, the elongated shape of the inlet disclosed in the subject invention removes more of the feedstock from the annular channel than the prior art inlet. Therefore, by preventing spillage onto the metering plate and more effectively removing the feedstock from the annular channel, the feeder apparatus minimizes the possibility of any particles of the feedstock becoming trapped between the metering plate and the pay-out device or between the metering plate and the pick-up device, thereby preventing the particles of feedstock from cold-welding together and damaging the metering plate or blocking the inlet of the pick-up device.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 7 is an enlarged fragmentary cross sectional view of the feeder apparatus showing the pick-up device;

FIG. 8 is a top plan view of the pick-up device;

FIG. 9 is a cross sectional side view of the pick-up device;

DETAILED DESCRIPTION OF THE INVENTION

Referring to the Figures, wherein like numerals indicate like or corresponding parts throughout the several views, a feeder apparatus is shown generally at 20.

The feeder apparatus 20 supplies a flow of a feedstock 22 to a processing operation, such as a plasma spray or a kinetic spray facility. The feedstock 22 is in the form of a ductile or non-ductile powder, and may include a pure metal, a metal alloy, a plastic polymer, a ceramic metal oxide, or a ceramic metal carbide material. It should be understood that other powdered materials may also be used in conjunction with the feeder apparatus 20.

Figure 1:
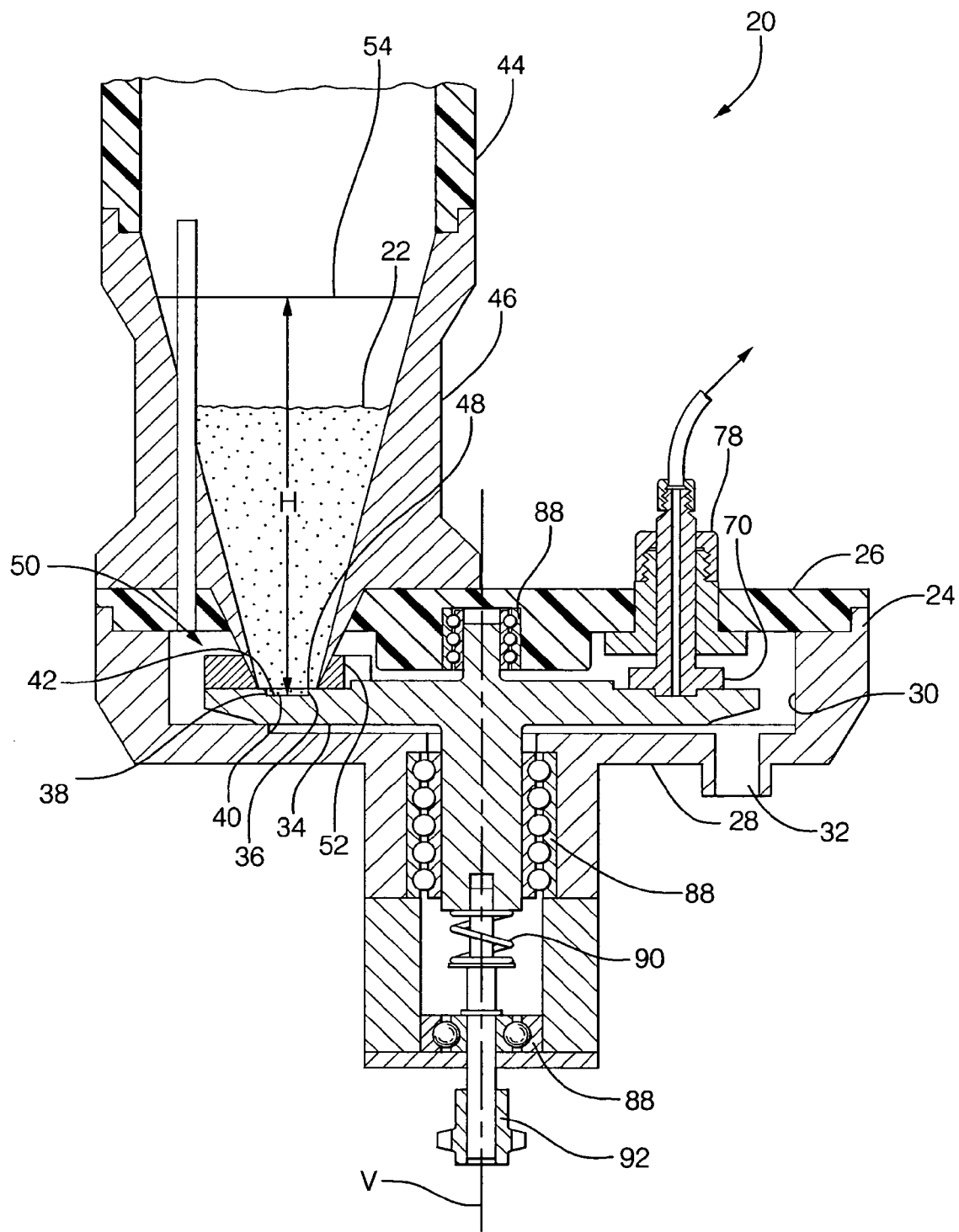
FIG. 1 is a partial cross sectional view of a feeder apparatus.
Figure 2:
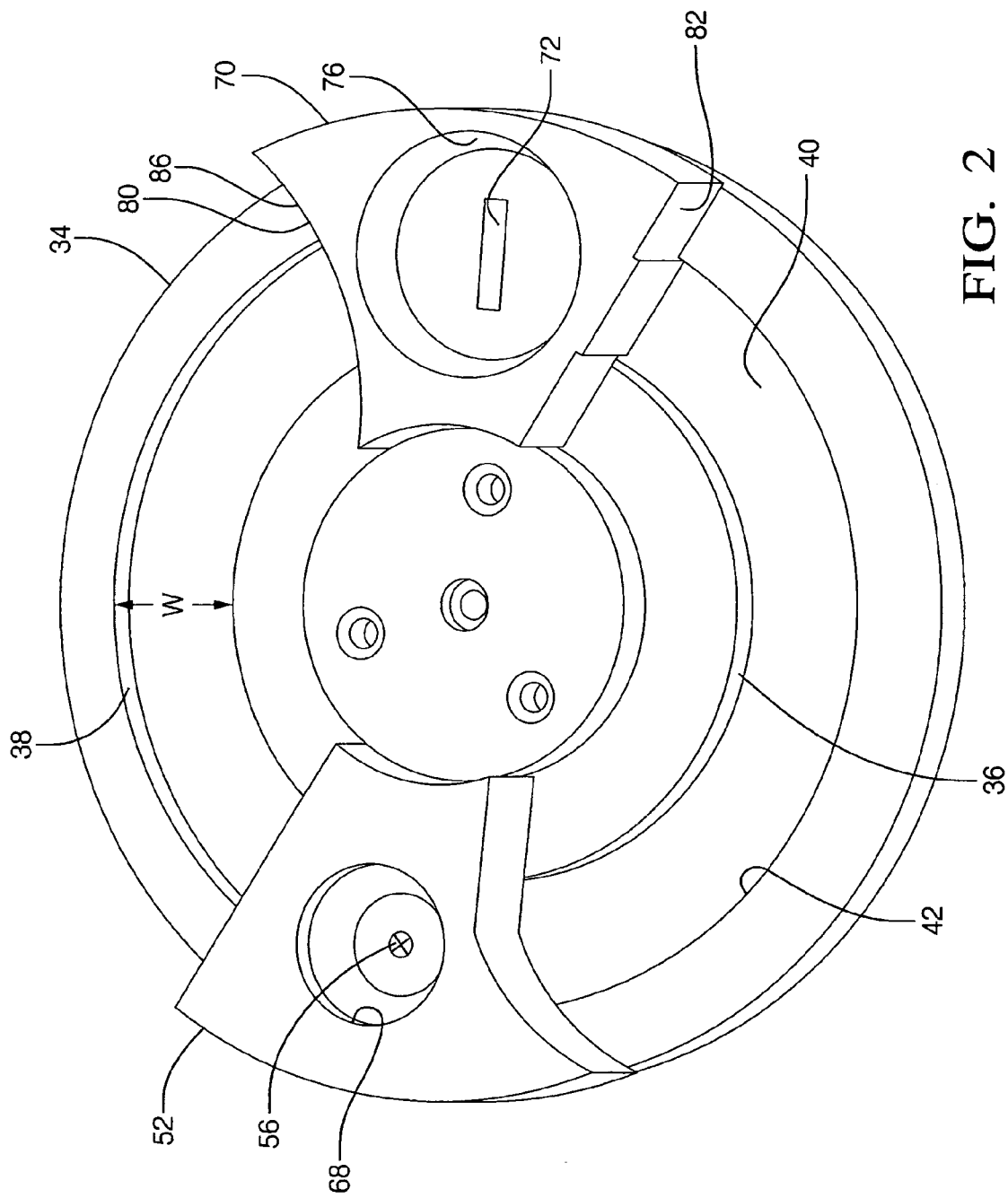
FIG. 2 is a perspective view of a metering plate with a pick-up device and a pay-out device positioned thereon.

Referring to FIG. 1, the feeder apparatus 20 includes a casing 24 having a top portion 26 and a bottom portion 28. The top portion 26 and the bottom portion 28 of the casing 24 define a sealed interior chamber 30 therebetween. The bottom portion 28 of the casing 24 defines a gas port 32 therein for supplying a gas into the sealed interior chamber 30. The gas entering the sealed interior chamber 30 is at an operating pressure, which is greater than a pressure at the processing operation. Accordingly, (as described below) there is a pressure differential between the sealed interior chamber 30 and the processing operation which causes the feedstock 22 to flow from the sealed interior chamber 30 to the processing operation.

A metering plate 34 is disposed within the sealed interior chamber 30 of the casing 24, and includes an inner sidewall 36, an outer sidewall 38, and a bottom wall 40 defining an annular channel 42 therebetween. The metering plate 34 is in spaced radial relationship with a vertical axis V for rotation about the vertical axis V.

Figure 3:
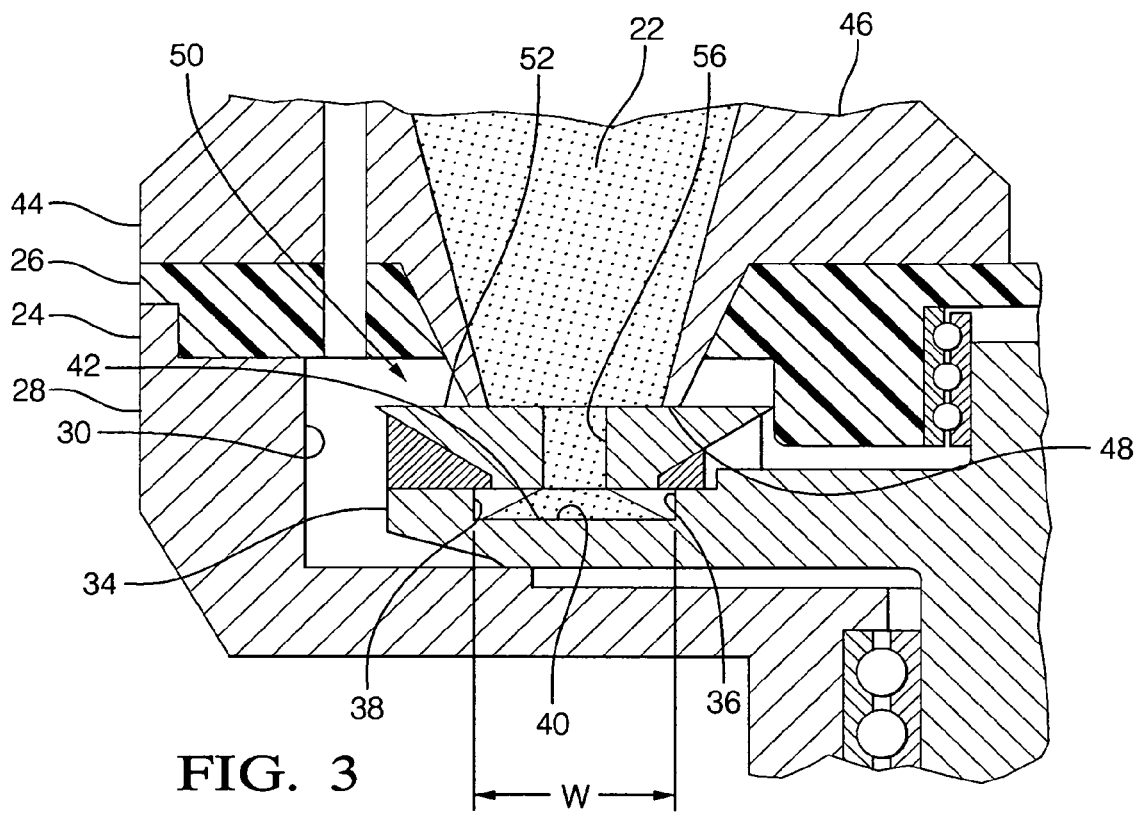
FIG. 3 is an enlarged fragmentary cross sectional view of the feeder apparatus showing the pay-out device.
Figure 4:
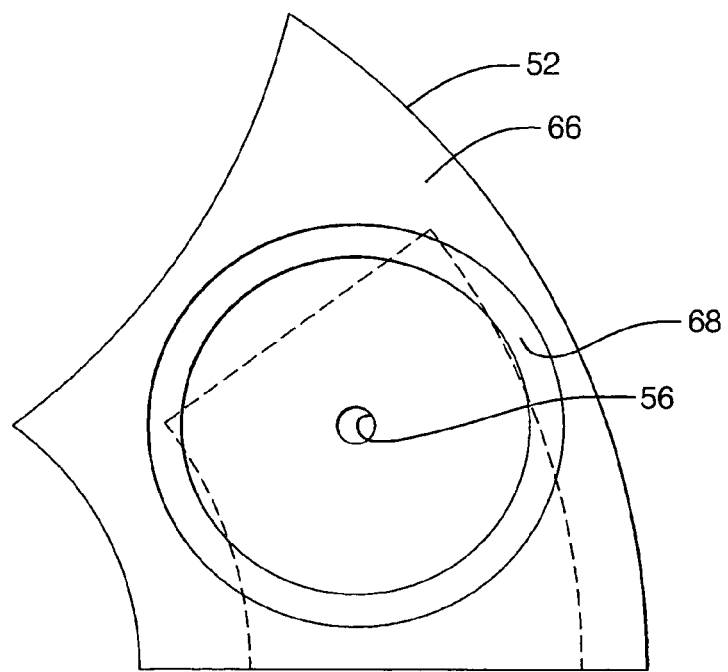
FIG. 4 is a top plan view of the pay-out device.
Figure 5:
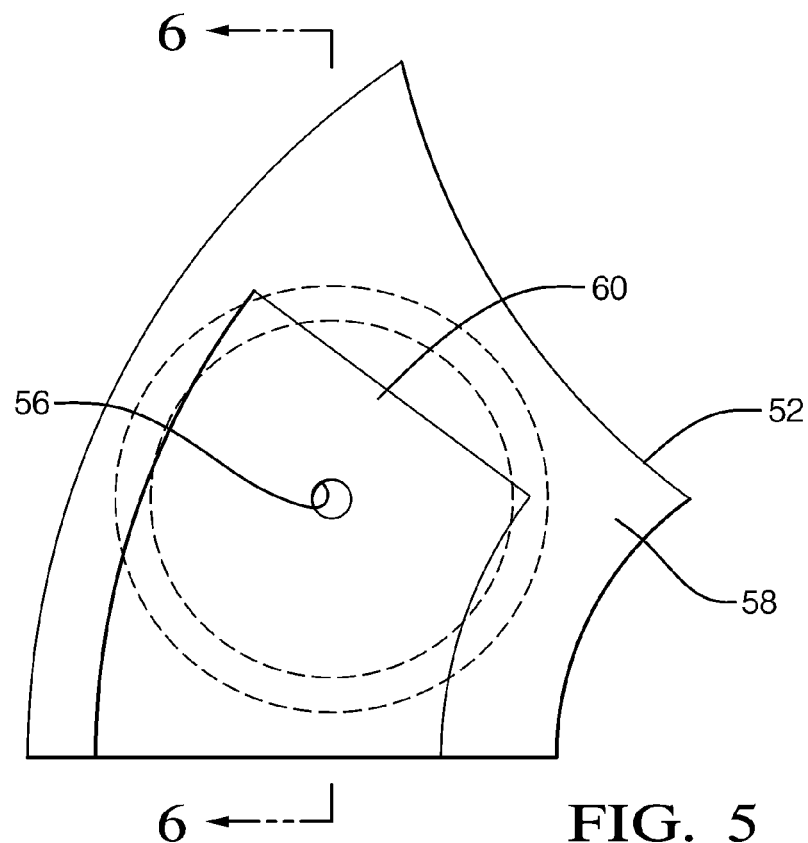
FIG. 5 is a bottom plan view of the pay-out device.
Figure 6:
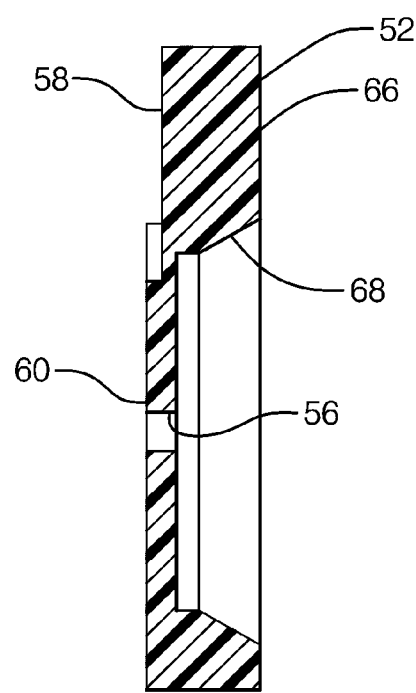
FIG. 6 is a cross sectional side view of the pay-out device.
Figure 10:
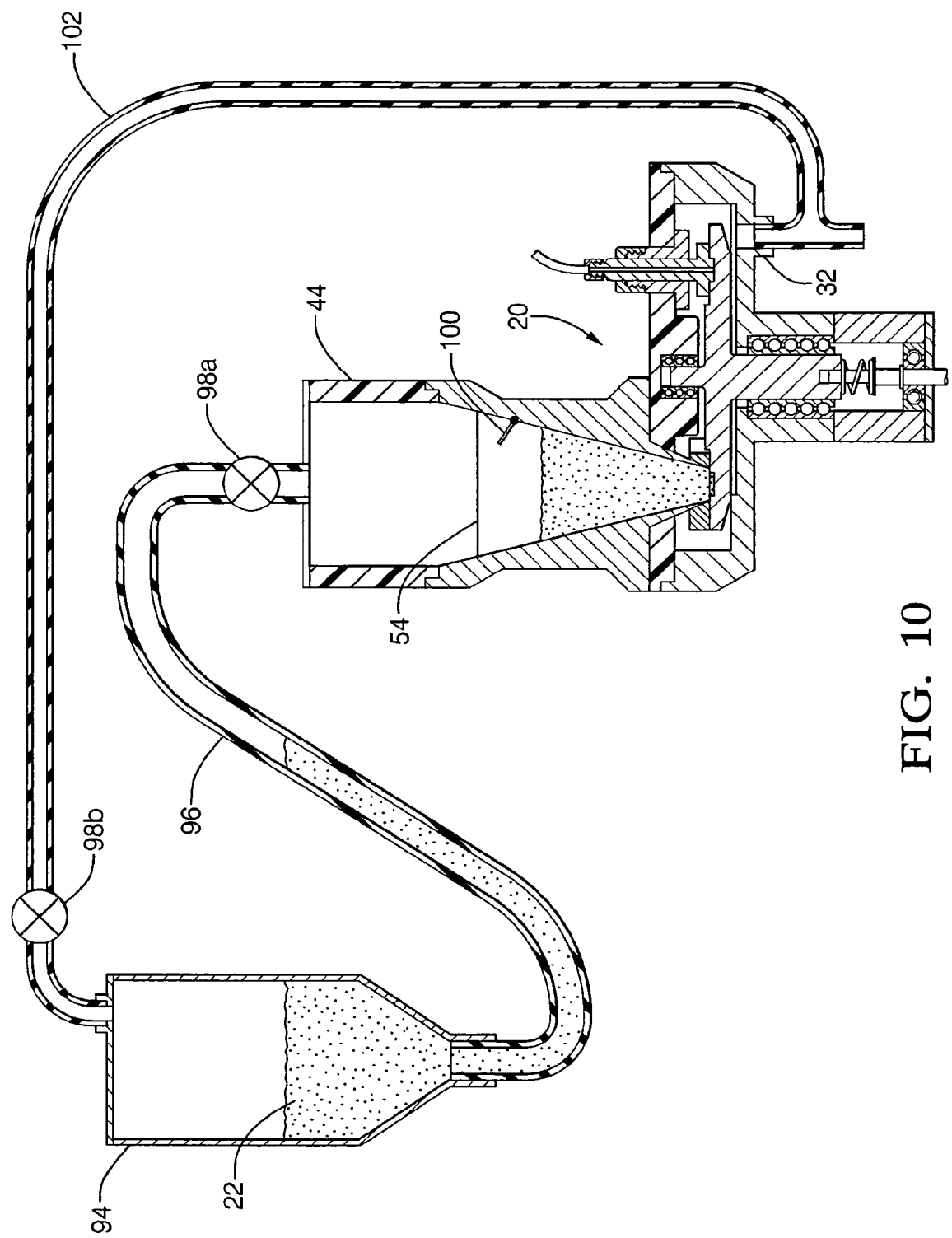
FIG. 10 is a schematic view of the feeder apparatus connected to a refilling canister.
Figure 11:
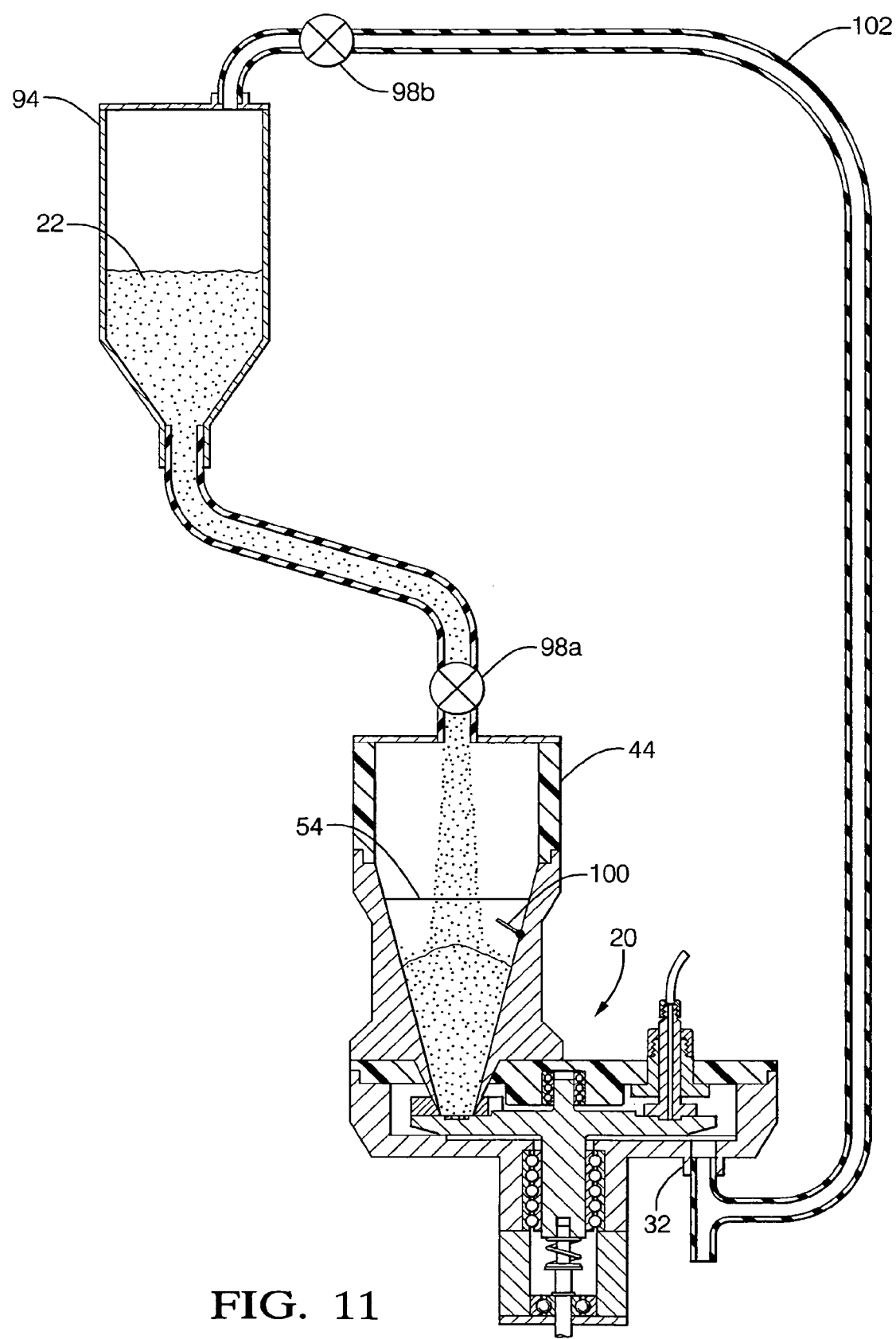
FIG. 11 is a schematic view of the feeder apparatus connected to the refilling canister while refilling the feeder apparatus.

A hopper 44 is disposed above the metering plate 34 for storing the feedstock 22 therein. The hopper 44 includes a funnel 46 having a dispensing end 48 for discharging the feedstock 22. A measuring mechanism, generally shown at 50, dispenses a measured volume of the feedstock 22 from the hopper 44 into the annular channel 42 of the metering plate 34. The measuring mechanism 50 includes a pay-out device 52 and a maximum fill level 54 in the hopper 44. The pay-out device 52 is disposed between the hopper 44 and the metering plate 34. The maximum fill level 54 in the hopper 44 is disposed a pre-determined height H above the bottom wall 40 of the metering plate 34. The maximum fill level 54 defines a maximum pressure head in the feedstock 22, which is less than a retaining pressure defined by an internal friction of the feedstock 22 disposed between the bottom wall 40 of the annular channel 42 and the pay-out device 52. As best shown in FIG. 3, the retaining pressure restricts the feedstock 22 against a downward force exerted by the pressure head to prevent the feedstock 22 from spreading outwardly within the annular channel 42, and contacting the inner sidewall 36 and the outer sidewall 38 of the metering plate 34. Accordingly, the measuring mechanism 50 dispenses a measured volume of the feedstock 22 into the annular channel 42 without the feedstock 22 spilling over the inner sidewall 36 or the outer sidewall 38 and onto the metering plate 34. It should be understood that if the feedstock 22 is filled above the maximum fill level 54, the feedstock 22 will flow continuously from the hopper 44 into the annular channel 42 until the pressure head falls below the retaining pressure.

Since the feedstock 22 behaves like a fluid in the hopper 44, the maximum fill level 54 may be determined by adding the feedstock 22 to the hopper 44 until the pressure head increases to a critical level. This critical level is where the pressure head produces a downward force sufficient to urge the feedstock 22 outward against the inner sidewall 36 and the outer sidewall 38. The maximum fill level is disposed in the hopper 44 just below this critical level. Accordingly, the feedstock 22 is dispensed into the annular channel 42 in an essentially trapezoidal cross section, with the retaining pressure maintaining the trapezoidal cross section against the downward force of the pressure head. The pressure head tends to urge the feedstock 22 out of the trapezoidal shape and against the inner sidewall 36 and the outer sidewall 38. So long as the feedstock 22 within the hopper 44 does not exceed the predetermined height H of the maximum fill level 54, the feedstock 22 will maintain its trapezoidal shape against the downward force of the pressure head, and not be forced outward against the inner sidewall 36 and the outer sidewall 38.

Referring to FIGS. 2 through 6, the pay-out device 52 defines an outlet 56 for distributing the feedstock 22 from the hopper 44 to the annular channel 42 therethrough. The annular channel 42 includes a channel width W, and the outlet 56 is preferably circular having a diameter significantly less than the channel width W. Preferably, the diameter of the outlet 56 is less than 15% of the channel width W of the annular channel 42. In a specific embodiment, the channel width W is equal to 1.135 inches and the diameter of the outlet 56 is equal to 0.125 inches. However, it should be understood that the diameter of the outlet 56 and the channel width W may be otherwise sized so long as the diameter is significantly small enough relative to the channel width W to dispense the feedstock 22 into the annular channel 42 without the feedstock 22 spilling over the inner and outer sidewalls 36, 38 of the annular channel 42, with respect to the relative pressure differential between the pressure head and the restraining pressure.

The pay-out device 52 further includes a bottom surface 58 abutting the metering plate 34. A tab 60 extends partially into the annular channel 42 from the bottom surface 58 of the pay-out device 52 and is in spaced relationship with the bottom wall 40 of the metering plate 34. The tab 60 levels the feedstock 22 in the annular channel 42 to a pre-determined thickness above the bottom wall 40 as the metering plate 34 rotates under the pay-out device 52.

The dispensing end 48 of the funnel 46 is disposed adjacent the pay-out device 52. The pay-out device 52 includes a top surface 66 defining a pocket 68 therein for receiving the dispensing end 48 of the funnel 46, and aligning the dispensing end 48 of the funnel 46 with the outlet 56 of the pay-out device 52.

Referring to FIGS. 7 through 9, a pick-up device 70 is disposed within the sealed interior chamber 30 of the casing 24, above the metering plate 34. The pick-up device 70 defines an inlet 72 for removing the feedstock 22 therethrough from the annular channel 42. The inlet 72 includes an elongated shape 74 disposed over the annular channel 42. The elongated shape 74 has a length EL extending tangentially relative to the annular channel 42 and a width EW extending perpendicularly relative to the length EL of the elongated shape 74. The width EW of the elongated shape 74 is greater than the length EL of the elongated shape 74. Preferably, the elongated shape 74 includes a rectangular shape having a length EL of the elongate shape less than 10% of the width EW of the elongated shape 74. In a specific embodiment, the length EL of the elongated shape 74 is equal to 0.032 inches and a width EW of the elongated shape 74 is equal to 0.47 inches. It should be understood that the length EL and the width EW of the elongated shape 74 may be differently sized than specifically mentioned above, so long as the width EW of the elongated shape 74 extending across the annular channel 42 is greater than the length EL of the elongated shape 74 tangent to the annular channel 42.

In contrast to the prior art pick-up devices that utilized an inlet having a circular opening with a diameter significantly less than the channel width of the annular channel, the elongated shape 74 of the subject invention extends across the annular channel 42. By extending across the annular channel 42, the subject invention minimizes the distance the feedstock 22 must travel within the annular channel 42 to reach the inlet 72.

The pick-up device 70 includes a top surface 77 defining a recess 76 therein. A removal device 78 is at least partially received in the recess 76 of the pick-up device 70 and coupled to the pick-up device 70. The removal device 78 conveys the feedstock 22 from the pick-up device 70 to the processing operation. The recess 76 receives and aligns the removal device 78 with the elongated shape 74 of the inlet 72. The gas port 32 supplies a continuous flow of the gas at the operating pressure into the sealed interior chamber 30. Typically, the gas will be under pressure greater than atmospheric pressure, thereby pressurizing the sealed interior chamber 30. Since the operating pressure within the sealed interior chamber 30 is greater than at the processing operation, the gas will flow from the sealed interior chamber 30, through the inlet 72 of the pick-up device 70 and the removal device 78, and to the processing operation. It should be understood that the same effect could be obtained by supplying the gas to the sealed interior chamber 30 at atmospheric pressure and creating a vacuum at the processing operation, thereby drawing the gas from the sealed interior chamber 30 to the processing operation. The flow of gas exits the sealed interior chamber 30 through the removal device 78. The flow of gas rushes through the inlet 72 of the pick-up device 70 from the annular channel 42, suspending the particles of the feedstock 22 in the annular channel 42 within the flow of the gas. The flow of gas then carries the feedstock 22 from the annular channel 42, through the inlet 72 of the pick-up device 70 and the removal device 78, to the processing operation.

Preferably, the inlet 72 defined by the pick-up device 70 is disposed closer to the outer sidewall 38 of the annular channel 42 than the inner sidewall 36. This provides better removal of the feedstock 22 from the annular channel 42 because the rotational movement of the metering plate 34 causes the outer sidewall 38 of the annular channel 42 to rotate at a faster rotational speed relative to the inner sidewall 36. Accordingly, the pick-up device 70 must remove the feedstock 22 from the annular channel 42 at a faster rate adjacent the outer sidewall 38 than adjacent the inner sidewall 36. The inlet 72 is therefore disposed closer to the outer sidewall 38 to provide a more direct flow path for the removal of the feedstock 22 from the annular channel 42, thereby increasing the amount of feedstock 22 removed from the annular channel 42 and the efficiency of the pick-up device 70. Alternatively, the width EW of the elongated shape 74 is greater than the channel width W, with the elongated shape 74 extending outwardly past the outer sidewall 38 of the annular channel 42.

The pick-up device 70 further includes a guide end 80, a trailing end 82, and a bottom surface 83. The bottom surface 83 of the pick-up device 70 abuts the metering plate 34 and includes a projection 84 extending from the bottom surface 83 partially into the annular channel 42, and is in spaced relationship with the bottom wall 40 of the metering plate 34. The projection 84 permits the flow of the gas between the pick-up device 70 and the bottom wall 40 of the annular channel 42 from both the guide end 80 and the trailing end 82 of the pick-up device 70. Accordingly, the flow of the gas may enter the inlet 72 of the pick-up device 70 from both the guide end 80 and the trailing end, thereby increasing the amount of the feedstock 22 suspended in the flow of gas and the amount of the feedstock 22 removed from the annular channel 42.

The guide end 80 of the pick-up device 70 includes an angular edge 86, which extends radially outward from the vertical axis V. The angular edge 86 helps direct any of the feedstock 22 disposed on the metering plate 34 back into the annular channel 42 as the metering plate 34 rotates under the pick-up device 70. Accordingly, any of the feedstock 22 disposed on the metering plate 34 will be directed back into the annular channel 42 before sliding between the pick-up device 70 and the metering plate 34, thereby preventing the cold-welding of the feedstock 22 between the pick-up device 70 and the metering plate 34 and damaging the metering plate 34.

The feeder apparatus 20 further includes at least one bearing 88 disposed in the casing 24 for rotatably supporting the metering plate 34. A biasing device 90 urges the metering plate 34 upward against the pay-out device 52 and the pick-up device 70 to maintain constant pressure therebetween. Accordingly, the pick-up device 70 and the pay-out device 52 are supported by the metering plate 34. A motor 92 is coupled to the metering plate 34 for rotating the metering plate 34 about the vertical axis V.

The feeder apparatus 20 may operate in batches, where the feeder apparatus 20 and the processing operation must stop when the hopper 44 is empty. The hopper 44 is then refilled and the feeder apparatus 20 and the processing operation may then be re-started. The hopper 44 may be sized to accommodate an eight hour shift, or may be otherwise sized per specific operating needs. It is important to note that the hopper 44 may be sized to include a large area, so long as the feedstock 22 does not extend above the pre-determined height H defining the maximum fill level 54.

Alternatively, the feeder apparatus 20 may be configured to run continuously. When configured to run continually, the feeder apparatus 20 includes a canister 94 in fluid communication with the hopper 44 of the feeder apparatus 20 for supplying (re-filling) the hopper 44 with the feedstock 22. A hose 96 interconnects the canister 94 and the hopper 44. A valve 98 is disposed in the hose 96 for opening and closing fluid communication between the canister 94 and the hopper 44. The hopper 44 includes a switch 100 for signaling the canister 94 to supply the hopper 44 with the feedstock 22 once the feedstock 22 falls below a pre-determined level. A pressure bypass 102 interconnects the gas port 32 of the casing 24 and the canister 94, and includes a valve 98 for opening and closing fluid communication between the gas port 32 and the canister 94. It should be understood that the canister 94 may fill the hopper 44 up to, but not above the maximum fill level 54 in the hopper 44.

To support continuous operation of the feeder apparatus 20, the subject invention provides a method of supplying the feedstock 22 via the canister 94 to the feeder apparatus 20, while the feeder apparatus 20 is operating continuously. As described above, the feeder apparatus 20 operates with the pressure differential between the sealed interior chamber 30 and the processing operation, and must maintain this pressure differential to operate properly. A drop in the pressure differential will result in less of the feedstock 22 being removed form the annular channel 42 of the metering plate 34.

The method includes signaling the canister 94 to indicate a need for the feedstock 22. The switch 100 signals the canister 94 to supply the hopper 44 with the feedstock 22. It is important that the switch 100 signals the canister 94 prior to the hopper 44 running out of the feedstock 22, and with enough time for the canister 94 to supply the hopper 44 with more of the feedstock 22 before the hopper 44 runs out of the feedstock 22. The time required to supply the hopper 44 varies depending upon the configuration of the hopper 44 and a usage rate of the feedstock 22.

Once signaled, the canister 94 is pressurized to a pressure equivalent to the operating pressure of the feeder apparatus 20. The valve 98 is then opened to permit fluid communication between the canister 94 and the feeder apparatus 20. The hopper 44 is then supplied with the feedstock 22. Having the canister 94, hopper 44, and the feeder apparatus 20 at the same operating pressure allows the feeder apparatus 20 to maintain continuous operation while the canister 94 is in fluid communication with the feeder apparatus 20.

Once the canister 94 is pressurized and fluid communication opened between the canister 94 and the hopper 44, the canister 94 is raised above the feeder apparatus 20 to permit a gravitational flow of the feedstock 22 between the canister 94 and the feeder apparatus 20. The hopper 44 of the feeder apparatus 20 is then supplied with the feedstock 22 to the maximum fill level 54.

Preferably, the canister 94 is then lowered below the feeder apparatus 20 to stop the gravitational flow of the feedstock 22. The valve 98 is then closed to prevent fluid communication between the canister 94 and the hopper 44. Alternatively, it is possible that the valve 98 is closed to stop the gravitational flow of the feedstock 22 before lowering the canister 94 relative to the feeder apparatus 20.

The canister 94 is then vented to return the canister 94 to atmospheric pressure. This allows an operator to refill the canister 94 with the feedstock 22, if necessary, prior to the switch 100 further signaling the canister 94 to supply the feedstock 22 again. Another step includes filling the canister 94 with the feedstock 22.

The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A feeder apparatus for supplying a flow of a feedstock to a processing operation, said apparatus comprising:
    a casing having a top portion and a bottom portion and defining a sealed interior chamber therebetween;
    said casing defining a gas port for supplying a pressurized gas into said sealed interior chamber;
    a metering plate disposed within said sealed interior chamber for rotation about and in spaced radial relationship with a vertical axis;
    said metering plate including an inner sidewall, and outer sidewall, and a bottom wall defining an annular channel therebetween;
    a hopper disposed above said metering plate for storing the feedstock therein;
    a measuring mechanism for dispensing a measured volume of the feedstock from said hopper into said annular channel of said metering plate; and
    a pick-up device disposed above said metering plate for removing the feedstock from said annular channel and defining an inlet;
    said inlet including an elongated shape over said annular channel, said elongated shape having a length extending tangentially relative to said annular channel and a width extending perpendicularly relative to said length of said elongated shape with said width being greater than said length.

2. An apparatus as set forth in claim 1 wherein said inlet defined by said pick-up device is disposed closer to said outer sidewall of said annular channel than said inner sidewall.

3. An apparatus as set forth in claim 2 wherein said elongated shape includes a rectangular shape.

4. An apparatus as set forth in claim 1 wherein said annular channel includes a channel width and said width of said elongated shape is greater than said channel width and extends across said outer sidewall of said metering plate.

5. An apparatus as set forth in claim 1 wherein said pick-up device comprises:
    a guide end;
    a trailing end; and
    a bottom surface abutting said metering plate and including a projection extending from said bottom surface partially into said annular channel in spaced relationship with said bottom wall of said metering plate for permitting a flow of the pressurized gas between said pick-up device and said bottom wall from both said guide end and said trailing end of said pick-up device.

6. An apparatus as set forth in claim 5 wherein said length of said elongated shape is less than 10% of said width of said elongated shape.

7. An apparatus as set forth in claim 5 further comprising a removal device coupled to said pick-up device for conveying the feedstock from the pick-up device to the processing operation and said pick-up device including a top surface defining a recess for receiving said removal device therein and aligning said removal device with said elongated shape of said inlet.

8. An apparatus as set forth in claim 1 wherein said measuring mechanism includes a pay-out device disposed between said hopper and said metering plate and defining an outlet for dispensing the feedstock from said hopper to said annular channel therethrough.

9. An apparatus as set forth in claim 8 wherein said annular channel includes a channel width and said outlet of said pay-out device includes a diameter less than said channel width.

10. An apparatus as set forth in claim 9 wherein said diameter of said outlet is less than 15% of said channel width.

11. An apparatus as set forth in claim 8 wherein said measuring mechanism includes a maximum fill level in said hopper disposed a pre-determined height above said bottom wall of said metering plate for defining a maximum pressure head in the feedstock less than a retaining pressure defined by an internal friction of the feedstock disposed between said bottom wall and said pay-out device such that the retaining pressure restricts the feedstock against a force exerted by the pressure head to prevent the feedstock from spreading outwardly.

12. An apparatus as set forth in claim 8 wherein said pay-out device comprises a bottom surface abutting said metering plate and a tab extending partially into said annular channel in spaced relationship with said bottom wall of said metering plate for leveling the feedstock in said annular channel to a pre-determined thickness above said bottom wall as said metering plate rotates under said pay-out device.

13. An apparatus as set forth in claim 12 wherein said hopper includes a funnel having a dispensing end adjacent said pay-out device and said pay-out device includes a top surface defining a pocket for receiving said dispensing end of said funnel and aligning said dispensing end with said outlet of said pay-out device.

14. An apparatus as set forth in claim 1 further comprising a canister in fluid communication with said hopper for supplying said hopper with the feedstock.

15. An apparatus as set forth in claim 14 further comprising a valve for opening and closing fluid communication between said canister and said hopper.

16. An apparatus as set forth in claim 15 further comprising a pressure bypass interconnecting said gas port of said casing and said canister and further including a valve disposed in said pressure bypass for opening and closing fluid communication between said gas port and said canister.

17. An apparatus as set forth in claim 16 further comprising a switch for signaling said canister to supply said hopper with the feedstock.

18. An apparatus as set forth in claim 17 further comprising a hose interconnecting said canister and said hopper with said valve disposed therein.

* * * * *